July 25, 1939.   A. J. MUSSELMAN   2,167,551
BRAKE
Filed June 30, 1938

INVENTOR.
ALVIN J. MUSSELMAN
BY
Kwis Hudson & Kent
ATTORNEYS

Patented July 25, 1939

2,167,551

UNITED STATES PATENT OFFICE 2,167,551

BRAKE

Alvin J. Musselman, Cleveland Heights, Ohio

Application June 30, 1938, Serial No. 216,727

8 Claims. (Cl. 188—250)

This invention relates to improvements in brakes, and has to do with materials employed in all-metal brakes, that is to say brakes in which both friction surfaces are formed of metal.

Heretofore it has been the generally accepted practice in the case of all-metal brakes to employ for at least one of the braking surfaces a metal which is comparatively soft, that is to say no harder than plain cast iron, and usually considerably softer than that material. Where steel is used as one of the brake surfaces it has been common practice heretofore to employ bronze as the other brake surface. These two metals function well when the brake is new, but the bronze is subject to wear and after considerable use the brake loses efficiency on this account. It has been impossible heretofore to overcome this difficulty by the use of steel for both brake members, because a brake so constructed does not provide smooth braking action and the surfaces tend to score and scuff up. Because of the difficulties encountered in all metal brakes it has been common, as for instance in vehicle brakes, to utilize a fibrous lining for one of the members, such construction being satisfactory in practically every respect except in respect to wear. The brakes in an automobile instead of lasting for the life of the car are the first item which needs replacement.

I have discovered that two hard metals may be utilized however if the braking surface of one of them contains chromium, for example if it is hard chromium plated. The braking action is then smooth and effective and wear is negligible. Also, there is no brake squeal or other noise resulting from the setting of the brakes. In accordance with my invention the braking surfaces may run either lubricated or dry, with no difference in operation except in the degree of friction or braking action which they are able to exert for a given application of pressure.

One of the objects of the invention is the provision of an all metal brake that is strongly wear resistant.

Another object is the provision of such a brake in which the braking action is soft and smooth as well as effective.

Other objects and fetaures of novelty will appear as I proceed with the description of that embodiment of the invention which, for the purposes of the present application, are illustrated in the accompanying drawing, in which—

Figure 1:
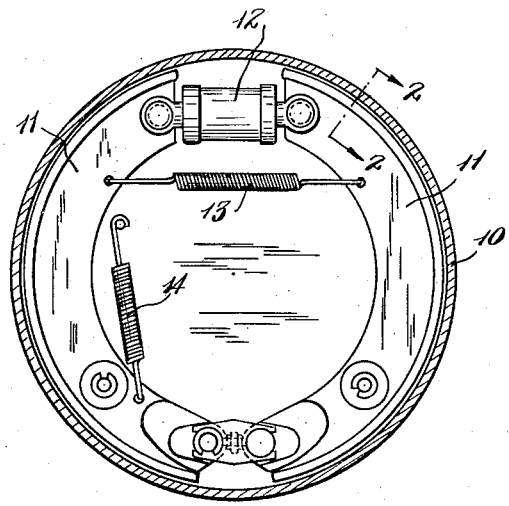
Fig. 1 is an elevational view of an automobile brake with the drum shown in section.
Figure 2:
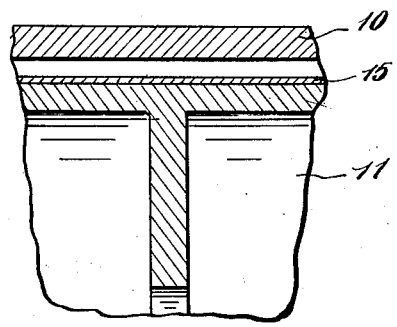
Fig. 2 is a detail sectional view on a larger scale, the section being taken substantially on the line 2—2 of Fig. 1.

The brake herein illustrated comprises a drum 10 and a pair of brake shoes 11, the outer surfaces of which are concentric with the drum 10. The shoes are adapted to be expanded or spread apart into drum engaging position by suitable means which in the present case includes a hydraulic cylinder and piston 12, although the particular shoe actuating means has nothing to do with the present invention. Springs 13 and 14 tend to move the shoes away from engagement with the drum as soon as the brake operating pressure is relieved.

The drum 10 is formed of ferrous metal, preferably steel, and its inner or engaging surface is preferably hardened. For example it may be carbonized to a depth of approximately twenty-five thousandths of an inch. If it is a casting it may have a chilled inner surface.

The shoes 11 may be castings, forgings or even stampings. In any case they are formed preferably of ferrous metal and have a smooth outer surface which is accurately finished to the same curvature as the internal surface of the drum. I incorporate chromium in this smooth surface of each shoe. Preferably the chromium is electrochemically deposited and is what is known in the trade as hard chromium plating as distinguished from ordinary or soft chromium plating. The difference between these two classes of plating is due to a difference in the thickness of the metal deposited. Soft chromium plating may be no thicker than a tenth of a thousandth of an inch. Such a plating is sufficient to provide a chromium appearance and to resist corrosion. It is not satisfactory for my purposes. In accordance with my invention the chromium plating must be thick enough to provide a hard surface. I have found a thickness of one thousandth of an inch to be satisfactory. Such a thickness may be obtained by using a voltage of six to eight volts, and 900 amperes per square foot of surface to be plated, and leaving the shoes in the bath for one hour approximately. It should be understood however that more or less variation in the thickness of the coating is permissible so long as it results in a hard surface as distinguished from one which is useful merely to enhance appearance or to resist corrosion. The expression "hard chromium plated" as hereinafter used is intended to distinguish from ordinary thin chromium plating as commonly employed to prevent corrosion. Although the electroplating method is a highly satisfactory one for obtaining a hard chromium surface on the shoes, other methods for coating the surface or otherwise providing a hard chromium surface may be employed. The chromium is illustrated in an exaggerated manner at 15 in the drawing.

It should be understood that the chromium may be applied to the drum rather than to the shoes if desired. It should also be understood that the number of shoes employed may be varied, that is a single shoe or a plurality of shoes greater than two may be used. As a matter of fact the invention lends itself to the use of a single shoe having a strong wrapping action for the reason that the smooth hard engaging surfaces have little tendency to grab, and readily separate when the brake applying pressure is relieved.

I am aware of the fact that chromium coatings have been proposed for brake members on account of the corrosion resisting qualities of chromium, but such coatings have been proposed only for use in connection with other brake members of relatively soft material, so that no substantial advantage has been realized from the hardness and resistance to wear of the chromium coating. The present invention on the contrary goes far beyond the step of preventing corrosion although it has that incidental effect upon the brake member to which the chromium is applied or in which it is incorporated.

Having thus described my invention I claim:

1. In a brake, two brake members having friction surfaces adapted to be brought into engagement for braking purposes, one of said surfaces being steel and the other surface being hard chromium plated metal.

2. In a brake, two brake members having friction surfaces adapted to be brought into engagement for braking purposes, one of said surfaces being hardened steel and the other surface being hard chromium plated metal.

3. In a brake, two brake members having friction surfaces adapted to be brought into engagement for braking purposes, one of said surfaces being steel and the other surface being hard chromium plated steel.

4. In a brake, two brake members having friction surfaces adapted to be brought into engagement for braking purposes, one of said surfaces being hardened steel, and the other of said surfaces being hard chromium plated steel.

5. In a brake, two brake members having friction surfaces adapted to be brought into engagement for braking purposes, one of said surfaces being ferrous metal of a hardness above that of plain cast iron, and the other of said surfaces being hard chromium plated metal.

6. In a brake, two engaging brake members formed of steel, one of said members having an engaging surface in which chromium is incorporated to a depth of approximately one one-thousandth of an inch.

7. In a brake, two engaging brake members formed of metal higher in the hardness scale than plain cast iron, one of said members being plated on its engaging surface with chromium to a depth of approximately one one-thousandth of an inch.

8. In a brake, two brake members formed of hard metal having friction surfaces adapted to be brought into engagement for braking purposes, one of said members having chromium incorporated in its contacting surface to a depth of approximately one one-thousandth of an inch.

ALVIN J. MUSSELMAN.